United States Patent [19]

Bunkowski

[11] 4,141,872

[45] Feb. 27, 1979

[54] RAPID CURING MELAMINE-FORMALDEHYDE RESIN COMPOSITION

[75] Inventor: Kenneth D. Bunkowski, Cincinnati, Ohio

[73] Assignee: Formica Corporation, Cincinnati, Ohio

[21] Appl. No.: 856,055

[22] Filed: Nov. 30, 1977

Related U.S. Application Data

[60] Division of Ser. No. 746,445, Dec. 1, 1976, Pat. No. 4,076,896, which is a continuation of Ser. No. 697,083, Jun. 16, 1976, abandoned, which is a continuation of Ser. No. 600,012, Jul. 29, 1975, abandoned.

[51] Int. Cl.$^2$ .......................... C08L 61/32; C08K 3/18
[52] U.S. Cl. .......................... 260/29.4 R; 260/32.6 N; 260/33.2 R; 428/411; 428/530; 428/537
[58] Field of Search ............... 260/32.6 N, 29.4 R, 260/33.2 R, 33.4 R, 67.6 R, 32.6 N

[56] References Cited

U.S. PATENT DOCUMENTS

| | | | |
|---|---|---|---|
| 2,582,730 | 1/1952 | Wohnseidler | 260/67.6 X |
| 2,750,355 | 6/1956 | Ledden | 260/67.6 |
| 2,809,954 | 10/1957 | Kazenas | 260/67.6 X |
| 3,082,190 | 3/1963 | Boldizar | 260/67.6 |
| 3,159,593 | 12/1964 | Morini et al. | 260/29.4 |
| 3,161,591 | 12/1964 | Laurie | 260/67.6 |
| 3,202,635 | 8/1965 | Galinke | 260/67.6 |
| 3,721,651 | 3/1973 | Yates | 260/29.4 R |
| 3,816,232 | 6/1974 | Meiser | 428/530 X |
| 3,835,083 | 9/1974 | Tinkelenberg | 260/29.4 R |
| 3,859,243 | 1/1975 | Blasing, Jr. | 260/67.6 R X |

FOREIGN PATENT DOCUMENTS 652420 4/1951 United Kingdom.
893825 4/1962 United Kingdom.
966316 8/1964 United Kingdom.

*Primary Examiner*—Theodore E. Pertilla
*Attorney, Agent, or Firm*—Frank M. Van Riet

[57] ABSTRACT

A resin composition comprising
A. the resinous reaction product of melamine, formaldehyde and diethylethanolamine,
B. an ortho- or para-toluene sulfonamide,
C. ethyleneglycol phenyl ether or diglycol amine and
D. water and a method for the production thereof, are disclosed.

10 Claims, No Drawings

RAPID CURING MELAMINE-FORMALDEHYDE RESIN COMPOSITION

CROSS-REFERENCE TO RELATED APPLICATIONS

This application is a division of my copending application, Ser. No. 746,445, filed Dec. 1, 1976, U.S. Pat. No.4,076,896 which, in turn, is a continuation of my abandoned application Ser. No. 697,083, filed June 16, 1976, which, in turn, is a continuation of abandoned application Ser. No. 600,012, filed July 29, 1975, and entitled PAPER CONTAINING RAPID CURING MELAMINE-FORMALDEHYDE RESIN COMPOSITION.

BACKGROUND OF THE INVENTION

Because of their excellent color, hardness and solvent and chemical resistance, aminoplast resinous compositions, particularly melamine-formaldehyde resinous compositions, have found many uses in the plastics, molding, coating and laminating fields. These resins give a thorough impregnation and thereby insure a complete bond when employed in the production of laminates. Resistance to discoloration due to heat and light is also realized.

For many years, these resinous compositions have been used in the production of decorative, high pressure laminates wherein a plurality of phenolic resin impregnated kraft paper sheets have been used as a laminate core to which is bonded, at 310° F. and 1600 psi, melamine-formaldehyde resin impregnated decorative and overlay sheets. These laminates are then bonded to a rigid substrate and used as partitions, walls, doors, table and counter tops, etc.

More recently there has been a growing demand for a laminated panel which can readily be fabricated into furniture, kitchen cabinets and the like. These panels are produced by applying a single melamine-formaldehyde resinous composition impregnated decorative sheet to a particleboard substrate at much lower pressure and temperature, i.e., 160° C. and 325 psi. Consequently, these laminate panels have been designated "low pressure" panels as distinguished from the "high pressure" laminates discussed above.

Low pressure panels have been very favorably accepted by the industry, and as a result, extensive research has been recently undertaken to improve these panels. One area in the panel production which has not proven to be as successful as would be desired comprises the inability of the impregnated paper to be stored over a period of time which would enable the production of many sheets at one time, thereby obviating the necessity of producing said sheets at very short time intervals. That is to say, when the paper sheets are produced, it would be advantageous to be able to produce many sheets at one time for storage and later use. However, attempts to produce impregnated sheets in this manner have resulted in products which are only storage stable for 4-6 weeks. As a result, sheet production must also be effected every 4-6 weeks. Accordingly, if a new $\beta$-staged, impregnated paper sheet could be devised which had a longer storage life and resulted in panels which had an increased resistance to stress-cracking, particularly at low humidity, a long felt need would be satisfied.

SUMMARY OF THE INVENTION

I have now discovered a novel $\beta$-staged, impregnated paper which not only exhibits an unusually long storage stability of 10-12 weeks but also results in the production of low pressure decorative panels which have an increased stress-crack resistance over those panels now commercially available, especially under low humidity. A further advantage of my novel impregnated paper resides in the feature that when it is used to form low pressure panels, the panels per se possess greater abrasion resistance than those of the art because more resin can be applied to the paper surface.

DESCRIPTION OF THE INVENTION INCLUDING PREFERRED EMBODIMENTS

The storage stable paper of the instant invention comprises paper of at least about 60% $\alpha$-cellulose content, a basis weight of from about 50 to about 90 pounds per 3000 square foot ream, a pH of from about 6.25 to about 7.25 and a Gurley porosity of from about 15 to about 25 seconds per 100 c.c. of air having impregnated therein from about 55% to about 65%, by weight, based on the weight of the paper, of a $\beta$-staged resin composition comprising A. the resinous reaction product of melamine, formaldehyde and diethylethanolamine,
B. an ortho- or para-toluene sulfonamide,
C. ethyleneglycol phenylether,
D. water and
E. a catalyst.

These ingredients are all critical in the compositions used to form the instant paper, as are the specific concentrations of each component therein.

The melamine and formaldehyde comprise the major portion of the solids, as resin, of the composition. These components are reacted under the stringent reaction conditions mentioned hereinbelow, at a formaldehyde to melamine ratio of from about 1.7 to about 1.9 to 1, respectively, with from about 0.07 to about 0.16%, by weight, based on the total weight of the composition, of diethylethanolamine.

The ratio of formaldehyde to melamine is critical and when the ratio is about 1.6 to 1, poor melamine dissolution results and an inferior composition is produced while at ratios above about 2.2 to 1, the crack resistance of the panels produced from the paper containing the resinous compositions is poor.

Similarly, the amount of diethylethanolamine is critical. This material is needed to adjust the pH of the initial melamine-water-formaldehyde slurry to its proper value. Amounts lower than about 0.02% produce a drastically low pH which makes control of the end point of the composition very difficult as well as producing a composition which has a stability of less than about 3 days and panels therefrom which have poor stress-crack resistance. Concentrations of diethylethanolamine of about 0.2% cause elevated pH values and materially extend the cook time.

The constituent of the composition which constitutes the second largest ingredient is water. This component is generally present in amounts so as to result in an ultimate composition containing from about 55% to about 60% solids. The water therefore comprises from about 40% to about 45% of the composition, the other components of the final composition, of course, constituting the solids thereof, the majority being melamine-formaldehyde resin. The solids content of the composition, when less than about 50%, causes poor treatability when the composition is impregnated into the cellulosic decorative sheet. High surface resin content on the sheet is very difficult to achieve and longer drying time is needed to obtain a dried, β-staged impregnated sheet suitable for storage. A solids content of greater than about 65% causes poor melamine dissolution during the resin manufacture and therefore poor quality panels.

The sulfonamide component of the composition can constitute ortho-toluene sulfonamide, para-toluene sulfonamide or mixtures of ortho- and para-toluene sulfonamide, the latter mixtures being preferred since normal commercial production of these compounds results in the formation of such a mixture. These mixtures usually contain from about 5% to about 40% ortho and, correspondingly, from about 60% to about 95% para of the isomers. The toluene sulfonamide is incorporated into the resinous composition in order to increase the stability thereof and also to plasticize the melamine-formaldehyde resin. Compositions containing no toluene sulfonamide exhibit a stability of less than 3 days and panels produced therefrom show unacceptable cracking at low humidity. At least about 1.0% of the toluene sulfonamide must therefore be used. Preferred amounts range from about 1.0% to about 4.0%, higher concentrations there having no detrimental effect on the compositions or the panel produced therefrom but adding materially to the economic considerations involved in the production thereof.

The final critical component of the composition is ethylene glycol phenyl ether. This material is also known as phenyl cellosolve or phenoxyethanol. It is also added to the composition in order to assist in plasticizing the melamine-formaldehyde resin. It also produces optimum flow in the composition during the heat and pressure consolidation of the panel. Absence of the ether causes the panel produced from the resultant composition to exhibit very poor crack resistance and very poor appearance due to a lack of resin flow. When the ether is incorporated into the composition at levels of 10% and above, excessive flow occurs during panel production and unsightly products result. The preferred concentration of ethylene glycol phenyl ether ranges from about 1.0% to about 5.0%, by weight. The ether can be replaced, in whole or in part, by an equivalent amount of diglycolamine.

All the percentages of the components of the composition mentioned herein are by weight, based on the total weight of the composition, if not otherwise indicated.

Other ingredients may also be incorporated into the compositions in order to render them even more useful. For example, lecithin has been found to be effective in increasing the release characteristics of the composition when pressing a panel. Hydrolyzed lecithin is preferred for the purpose. Useful amounts range from about 0.1% to about 1.5%, by weight, based on total weight of the composition. Wetting agents, such as arylalkylpolyethers, may also be added.

Before impregnation of the resinous composition into the cellulosic decorative sheet according to the instant invention, it is also necessary to incorporate a catalyst therein in order to produce a sheet containing β-staged resin which will cure to a thermoset state during heat and pressure consolidation. I have found catalytic amounts of ammonium sulfate useful for this purpose. Amounts ranging from about 0.04% to about 0.08% have proven satisfactory. Thiourea dioxide, thiourea, can also be used at similar concentrations. The Sunshine Gel time should be 7-8 minutes at 136° C. after the catalyst addition.

The low pressure melamine-formaldehyde resin formulation is produced by adding the water to the reaction vessel and charging the formalin, diethylethanolamine and melamine crystal thereto. The charged materials are thoroughly admixed for about 5 minutes and the pH is then determined. It should range from about 9.0 to about 9.8 at 25° C. A high pH can be lowered by adding small, successive increments of 90% formic acid and continually testing the pH or adding more formaldehyde or water after performing an assay of the charge and determining that one of these components was mischarged. A low pH can be corrected by adding additional diethylethanolamine in small increments while continually testing the pH or again determining if a mischarge of water or formalin was made and adding either depending upon said determination.

Once the pH is found to be within the above-specified range, the reaction media is heated to 90° C. until the melamine crystal is dissolved but not exceeding 45 minutes. The vessel is then cooled to 80° C.-88° C. and the reaction is allowed to proceed until a water tolerance of about 300% with 25° C. water is reached, usually in 4 to 5½ hours.

The reaction media is then allowed to cool to 30° C. and the toluene sulfonamide and the ethyleneglycol phenyl ether are added. The resultant composition is then filtered and stored, preferably at 68°-77° F.

The above specified cook time and cook temperature are also critical with regard to the process and are intimately interdependent. That is to say, the temperature of the cook governs the properties of the ultimate resin composition and also determines how long the cook must be conducted. At temperatures below about 80° C. the properties of the resin composition are satisfactory but the cook time is uneconomically increased to from about 8-12 hours. Poor stability of the resin formulation and poor crack resistance of panels prepared therefrom are exhibited when the cook temperature is raised above about 88° C.

After recovery from the composition production vessel, the low-pressure resin formulation should have the following properties:

| Parameter | Limits | Method |
|---|---|---|
| pH at 25° C. | 9.0 – 9.8 | ASTM - E-70-52T |
| Specific Gravity at 25° C. | 1.24 ± .015 | Westphal Balance |
| Water Tolerance at 25° C. | 100 ± 20 | — |
| ASTM Solids (3 hrs at 105° C.) | 59 ± 1% | ASTM - D-1289-64 |
| APHA Color Standard | 30 max; clear | — |
| Sunshine Gel Time at 136° C. | 14-18 mins. | Sunshine Scientific Gel Meter |
| Free Formaldehyde | 0.5% max. | Sodium Sulfite |
| Viscosity at 25° C. Model RVT Speed 20 Spindle 1 | 40-60 cps. | Brookfield |

The decorative papers from which the novel impregnated, β-staged papers of the present invention are produced are made for bleached wood pulp which is high, at least about 60% in alpha cellulose content. The papers are pigmented in a known manner to obtain the desired levels of color and opacity. They range in basis weight from about 50-90 pounds per 3,000 square foot ream. The paper has a controlled pH of about 6.75 ± 0.5 due to the influence pH has on the reaction rate of the melamine resin after it is applied thereto. Variances in this pH range have adverse effects on the storage life of the treated paper and/or press cycle times when the panel is being produced.

The decorative surface paper porosity (Gurley) is preferably controlled to 15–25 seconds per 100 c.c. of air to assure proper treating of the paper with the resin and pressing of the panel. A paper having too high a porosity will allow too much resin to penetrate and will result in dry spots on the panel produced therefrom. A paper with too low a porosity will not enable sufficient resin to penetrate and the excessive resin on the surface will cause a mottled appearance and surface crazing and/or cracking of the resultant panel made therefrom.

Impregnation of the paper and drying of the impregnated paper may be effected by conventional treaters and driers known to those skilled in the art. Vits treaters have been found to be particularly useful in this regard and achieve a high resin pick-up and uniform surface coating with sufficient surface resin to achieve an abrasion resistance of 75–100 cycles, NEMA LD 1–2.01. The resin content of the impregnated paper generally ranges from about 55% to about 65% by weight based on the weight of the impregnated paper. Paper volatile levels are maintained at about 5% ± 0.5. A balance between flow levels and treated weight of the treated paper is maintained to assure proper abrasion levels without reducing crack and/or craze resistance. Treated paper is $\beta$-staged by drying at 150° F. to about 36° F. for about 1 to about 15 minutes, and stored flat in a conditioned storage area. It has a nominal shelf life of at least about 3 months at 70°–75° F. and 40–50% relative humidity.

Core material, i.e., self-supporting substrates useful in producing the decorative low-pressure panels include medium density, mat-formed, wood particleboard and medium density, wood fiberboard. Useful core material, however, must enable the production of full-sized, smooth-faced, well-bonded, crack- and craze-resistant panels. Core materials should be stored for a sufficient time at ambient conditions to achieve an equilibrium temperature and an equilibrium moisture content of 7% ± 2.0.

The decorated layer may be placed on both sides or only on one side of the self-supporting substrate when panels are being produced. If the decorative sheet is placed only on one side of the substrate, it is preferred that a so-called balance sheet, i.e., a melamine-formaldehyde resin impregnated paper sheet, e.g. of Kraft or other paper, sometimes called a cabinet liner, be placed on the other side in order to prevent the resultant panel from warping during pressing.

Typical release sheets can be applied to both the decorative layer and the balance sheet to prevent the press plate from sticking thereto. A typical press cycle is 325 psi, 150°–160° C. for 60 ± 5 seconds.

The following examples are set forth for purposes of illustration only and are not to be construed as limitations on the present invention except as set forth in the appended claims. All parts and percentages are by weight unless otherwise specified.

EXAMPLE 1

(Part A)

Into a suitable reaction vessel equipped with thermometer and stirrer are charged 1482 parts of water, 4303 parts of 37% aqueous formaldehyde, 8 parts of diethylethanolamine, B.P. 163° C., and 3698 parts of melamine crystal. The charge is mixed at room temperature for 5 minutes and the pH is then determined to be 9.3. The vessel is heated to 90° C. and maintained until the melamine crystals dissolve (39 minutes). The charge is then cooled to 80° C. and reacted at that temperature until a water tolerance of 750% with 5° C. water is reached. The temperature is then raised to 83° C. and the reaction is continued until a final water tolerance of 300% with 25° C. water is achieved. A total reaction time of 3¾ hours elapses. The vessel is cooled to 30° C. while continually adding 306 parts of an ortho-, paratoluene sulfonamide mixture (50/50) and 203 parts of ethyleneglycol phenyl ether. When the solution reaches 30° C. it is filtered. A water-like resinous composition having a pH of 9.2, a specific gravity of 1.240, a water-tolerance of 100, a viscosity of 50 cps., a solids content of 59%, a free formaldehyde content of 0.37% and a Sunshine Gel time of 16 minutes is recovered. The composition (formaldehyde to melamine ratio of 1.8/1.0) is stored for 35 days without variation.

(Part B)

To 1000 parts of the composition, in a suitable mixing vessel, are added 20 parts of a 25% aqueous solution of hydroxylated lecithin, 0.8 part of a commercially available alkylaryl polyether having a Specific Gravity of 1.04 and a Flash Point of >480° F. (open cup), and 0.6 part of ammonium sulfate crystals, dissolved in water at a 1:4 ratio, respectively. Thorough agitation after each ingredient is charged results in a resin formulation having a Sunshine Gel time of 7 minutes.

(Part C)

A 65 pound basis weight, 3000 ft.$^2$ ream, absorbent $\alpha$-cellulose paper having a Gurley porosity of 20 seconds per 100 cc of air, a pH of 6.72 and a teakwood grain pattern thereon, is fed into an impregnating bath containing the resin formulation of Part B, above. The resultant, impregnated paper is then immediately $\beta$-staged by passing it through a forced air drying oven at 260° F. at a line speed of 55.0 ft./min. The resultant dry treated paper has a resin content of 60%, based on the dried weight, a volatile content of 5.0% and a flow of 1.0%. The impregnated paper is stored 3 months at 72° F. and 48% relative humidity without detrimental effect.

(Part D)

A 4'×8'×⅜" thick particleboard, weighing 45 pounds per cubic foot, with sanded surfaces is sandwiched between two 4'×8' sheets of the impregnated paper of Part C, above. The non-decorative surfaces of the paper sheets are in adjoint contact with the particleboard. The sandwich is placed between a pair of highly polished stainless steel pressure plates having a release coating thereon and is pressed at 155° C. for 60 seconds under a pressure of 325 psi. A decorative faced panel is recovered having an attractive, aesthetically pleasing surface with good wear, impact and craze resistance.

A test sample is cut from the panel and tested for its properties which are set forth in Table I, below.

EXAMPLE 2

The procedure of Example 1 is again followed except that the teakwood grain patterned decorative $\alpha$-cellulose sheet is replaced by a 90 lb. basis weight, 3000 ft.$^2$ ream, solid color white $\alpha$-cellulose paper of Gurley porosity of 15 seconds per 100 cc of air and a pH of 6.55.

Resin pick-up on impregnation is 54%. Paper volatile level is 5.5% and the flow level is 4.0%. Storage for 3 months at 72° F. and 48% relative humidity does not affect is properties, see Table I.

TABLE I

| PHYSICAL PROPERTY | RESULTS | NEMA LDI TEST |
|---|---|---|
| 1. Wear Resistance-cycles | | 2.01 |
| Example 1 Panel | 100 | |
| Example 2 Panel | 800 | |
| 2. Surface Resistance | | |
| A. Boiling Water | | 2.02 |
| Example 1 Panel | Moderate | |
| Example 2 Panel | Moderate | |
| B. High Temp.; ° C. | | 2.03 |
| Example 1 Panel | No effect | |
| Example 2 Panel | No effect | |
| 3. Cigarette Burn - secs. | | 2.04 |
| Example 1 Panel | 550 | |
| Example 2 Panel | 370 | |
| 4. Stains | | 2.05 |
| Neither panel affected by any of 29 reagents | | |
| 5. Color Fastness | | 2.06 |
| Example 1 Panel | No effect | |
| Example 2 Panel | Moderate | |
| 6. Dimensional Change | | 2.08 |
| (Average both panels) | | |
| Lengthwise % | .7 | |
| Crosswise % | .9 | |
| 7. Flexural Strength - psi | | 2.09 |
| (Average both panels) | | |
| Lengthwise | 3000 | |
| Crosswise | 3000 | |
| 8. Modulus of Electricity | | 2.09 |
| (Average both panels) | | |
| Lengthwise | 600,000 | |
| Crosswise | 600,000 | |
| 9. Deflection at Rupture | | 2.09 |
| (Ave. both panels) inches | | |
| Panels | 20 | |
| 10. Resistance to Impact | | 2.15 |
| (Inches Drop) | | |
| Example 1 Panel | 18 | |
| Example 2 Panel | 14 | |
| 11. Surface Crack Resistance | | 30 days, 10% RH; 70° F. ± 2.0 |
| Example 1 Panel | No cracks | |
| Example 2 Panel | No cracks | |
| 12. Machinability | | — |
| Example 1 Panel | Pass | |
| Example 2 Panel | Pass | |
| 13. Water absorption, % | | CS-176-58; 4.1.6 |
| (Average both panels) | 20 | |
| 14. Thickness Swell, % | | CS-176-58; 4.1.6 |
| (Average both panels) | 7 | |
| 15. Gloss (Average both panels) | | 2.13 |
| Lengthwise | 22 | |
| Crosswise | 22 | |

EXAMPLE 3

Example 1 is again followed except that the concentration of the following components charged to the reaction vessel in Part A thereof are varried as follows:
Water—2166 parts
44% aqueous formaldehyde sol.—3619 parts
All else remains constant. Again a highly stable resin composition results. Alpha-cellulose paper impregnated with the composition and dried is storage stable 3 months at 72° F. and 48% RH. Panels produced therefrom have properties substantially conforming to those of the panels set forth in Table I, above.

EXAMPLE 4

The procedure of Example 1 is again followed except that the toluene sulfonamide mixture is replaced by para-toluene sulfonamide. Similar results are achieved.

EXAMPLE 5

The procedure of Example 1 is again followed except that the ethyleneglycol phenyl ether is replaced by an equivalent amount of diglycolamine. The resin composition, impregnated alpha-cellulose papers and resultant panels all exhibit properties substantially the same as those of Example 1.

COMPARATIVE EXAMPLES 6-11

In order to show the criticality of the concentrations and other essential variables of the instant invention, the procedure of Example 1 is again followed except that the concentrations etc. are varied so as to be outside the scope of the instant invention. The results are set forth in Table II, below.

TABLE II

| Ex. | Condition Varied | Effect |
|---|---|---|
| 6 | (A) Formaldehyde/Melamine Ratio | |
| | 1.6 | Poor melamine dissolution (Part A) |
| | 2.2 | Poor crack resistance (Part D) |
| 7 | (B) Resin Cook Temperature | |
| | 75–78° C. | Extended cook time (Part A) |
| | 90–95° C. | Poor stability (Part A); Poor crack resistance (Part D) |
| 8 | (C) Diethylethanolamine conc. | |
| | 0.02% | Fast cook time, poor stability (Part A); Poor crack resistance (Part D) |
| | 0.20% | Extended cook time (Part A) |
| 9 | (D) Amount of Water (Solids Content) | |
| | >65% | Poor Composition production (Part A) |
| | <50% | Poor treatability (Part C) |
| 10 | (E) Toluene Sulfonamide conc. | |
| | 0% | Poor stability (Part A); Poor crack resistance (Part D) |
| | 10% | Too costly |
| 11 | (F) Ethyleneglycol Phenyl Ether conc. | |
| | 0% | Poor flow (Part C) Poor crack resistance (Part D) |
| | 10% | Excessive flow (Part C) |

EXAMPLE 12

Replacing about one-half of the ethyleneglycol phenyl ether with diglycolamine results in a composition substantially identical to that of Example 5.

EXAMPLE 13

The procedure of Example 1 is again followed except that the hydroxylated lecithin and alkylaryl polyether are omitted and the catalyst is thiourea dioxide. Similar results are achieved, release being effected by spraying the press plates with a commercially available release agent.

The water tolerance of the resin at any particular point in time during the reaction is determined by calculating the ratio of the milliliters of water to the milliliters of resin times 100 required to produce a milky, permanent turbidity, see U.S. Pat. No. 3,753,934.

EXAMPLE 14

Example 1 is repeated in all essential details except that an α-cellulose overlay of a basis weight of 20 pounds per 3000 square foot ream having been impregnated with the same resin used for the decor layer to a dried weight of about 72%, a volatile content of 6.5% and a flow of 8.0% is interposed between the decor surface and the press plate. After recovery, test samples are cut from the sample and tested as in Example 1. All properties are essentially the same except that the abrasion resistance is 475 revolutions.

I claim:

1. An aqueous, stable, low pressure resin composition comprising
    (a) the resinous reaction product of melamine, formaldehyde and from about 0.07 to about 0.16%, by weight, of diethylethanolamine, having a ratio of formaldehyde to melamine of from about 1.7 to about 1.9 to 1, respectively,
    (b) about 1.0% to about 4.0%, by weight, of ortho or para or mixtures of ortho and para toluene sulfonamide,
    (c) from about 1.0% to about 5.0%, by weight, of ethyleneglycol phenyl ether or diglycolamine and
    (d) from about 40% to about 45%, by weight, of water, the remainder being melamine/formaldehyde resin, all percentages being based on the total weight of the composition.

2. A composition according to claim 1 wherein B is p-toluene sulfonamide.

3. A composition according to claim 1 containing, in addition thereto, a catalytic amount of ammonium sulfate.

4. A composition according to claim 1 wherein B is a mixture of o- and p-toluene sulfonamide.

5. A composition according to claim 1 containing, in addition thereto, from about 0.1% to about 1.5%, by weight, same basis, of a lecithin.

6. A composition according to claim 3 wherein B is p-toluene sulfonamide.

7. A composition according to claim 1 having a pH ranging from about 9.0 to about 9.8.

8. A method for the production of the composition of claim 1 which comprises
    I. admixing water, melamine, formaldehyde and diethylethanolamine at a pH of from about 9.0–9.8 at about 90° C. for up to about 45 minutes,
    II. heating the resulting reaction solution at a temperature of from about 80°–88° C. for from about 4 to 5½ hours until a water tolerance of about 300% with 25° C. water is achieved,
    III. cooling to about 30° C. while adding ortho- or para- or mixtures of ortho- and para-toluene sulfonamide and ethyleneglycol phenyl ether or diglycolamine to the product of II and
    IV. recovering the resultant aqueous, stable, low pressure resin composition.

9. The method of claim 8 which comprises
    V. adding a lecithin to said resin composition.

10. The method of claim 8 which comprises
    VI. adding a catalytic amount of ammonium sulfate to said resin composition.

* * * * *